United States Patent
Stevenson et al.

(10) Patent No.: US 7,955,698 B2
(45) Date of Patent: Jun. 7, 2011

(54) FIBER-BASED ACOUSTIC TREATMENT MATERIAL AND METHODS OF MAKING THE SAME

(75) Inventors: James F. Stevenson, Morristown, NJ (US); Jeff M. Mendoza, Chandler, AZ (US); Daniel V. Brown, Surprise, AZ (US); Martin C. Baker, Budd Lake, NJ (US); Lee Poandl, Middlesex, NJ (US)

(73) Assignee: Honeywell International Inc., Morristown, NJ (US)

( * ) Notice: Subject to any disclaimer, the term of this patent is extended or adjusted under 35 U.S.C. 154(b) by 1022 days.

(21) Appl. No.: 11/601,128

(22) Filed: Nov. 15, 2006

(65) Prior Publication Data

US 2010/0090153 A1   Apr. 15, 2010

(51) Int. Cl.
  *B32B 5/16* (2006.01)
  *D02G 3/24* (2006.01)
(52) U.S. Cl. ......... 428/359; 428/399; 428/369; 428/361
(58) Field of Classification Search .......... 428/359, 428/399, 369, 361
  See application file for complete search history.

(56) References Cited

U.S. PATENT DOCUMENTS

| | | | |
|---|---|---|---|
| 4,313,524 A | | 2/1982 | Rose |
| 4,811,908 A | * | 3/1989 | Galati ............... 241/21 |
| 4,879,168 A | | 11/1989 | McCullough, Jr. et al. |
| 4,950,533 A | | 8/1990 | McCullough, Jr. et al. |
| 5,041,323 A | | 8/1991 | Rose et al. |
| 5,188,896 A | | 2/1993 | Suh et al. |
| 5,298,694 A | * | 3/1994 | Thompson et al. ........... 181/286 |
| 5,384,193 A | | 1/1995 | Suh et al. |
| 5,473,122 A | | 12/1995 | Kodiyalam et al. |
| 5,594,216 A | | 1/1997 | Yasukawa et al. |
| 5,639,700 A | * | 6/1997 | Braun et al. ................ 442/340 |
| 5,782,689 A | | 7/1998 | Woolsey et al. |
| 5,912,442 A | | 6/1999 | Nye et al. |
| 6,110,588 A | * | 8/2000 | Perez et al. ................ 428/359 |
| 6,129,077 A | | 10/2000 | Parini |
| 6,244,539 B1 | | 6/2001 | Liston et al. |
| 6,439,340 B1 | | 8/2002 | Shirvan |
| 6,840,349 B2 | | 1/2005 | Andre et al. |
| 7,226,656 B2 | * | 6/2007 | Coates et al. ............... 428/221 |
| 2006/0155064 A1 | | 7/2006 | Hansen |

* cited by examiner

*Primary Examiner* — William P Watkins, III
(74) *Attorney, Agent, or Firm* — Ingrassia Fisher & Lorenz, P.C.

(57) ABSTRACT

A fiber-based acoustic treatment material is provided. The material includes between about 3% and about 25% by weight of fibrillated microfibers, between about 20% and about 75% by weight of reinforcement microfibers, and between about 15% and about 60% by weight of a binder. Methods of making the material are also provided.

12 Claims, 3 Drawing Sheets

FIBER-BASED ACOUSTIC TREATMENT MATERIAL AND METHODS OF MAKING THE SAME

TECHNICAL FIELD

The present invention relates to noise suppression materials and, more particularly, to noise suppression materials for use in aircraft ducts and plenums, and methods of making the materials.

BACKGROUND

Many aircraft are powered by jet engines. In most instances, jet engines include one or more gas-powered turbine engines, auxiliary power units (APUs), and/or environmental control systems (ECSs), which can generate both thrust to propel the aircraft and electrical and pneumatic energy to power systems installed in the aircraft. Although most aircraft engines are generally safe, reliable, and efficient, the engines do exhibit certain drawbacks. For example, the turbine engines can be sources of unwanted noise, especially during aircraft take-off and landing operations. Moreover, APUs and ECSs can be sources of unwanted ramp noise while an aircraft is parked at the airport. Thus, various governmental and aircraft manufacturer rules and regulations aimed at mitigating such noise sources have been enacted.

To address, and at least somewhat alleviate, the unwanted noise emanating from aircraft noise sources, and to thereby comply with the above-noted rules and regulations, various types of noise reduction methods have been developed. For example, one noise reduction method that has been developed for use in aircraft ducts is a noise suppression panel. In many instances, noise suppression panels are flat or contoured, and include either a bulk noise suppression material or a honeycomb structure disposed between a backing plate and a face sheet. The noise suppression panels are typically placed on the interior surface of an engine or APU inlet and/or outlet ducts, as necessary, to reduce noise emanations.

Although the above-described noise suppression panels do exhibit fairly good noise suppression characteristics, the panels also exhibit certain drawbacks. For example, the bulk noise suppression material can be costly to manufacture and may not provide sufficient resistance to fluid wicking. The honeycomb structure may be difficult to conform to contoured surfaces. Additionally, the honeycomb structure can also be difficult to bond to the backing plate and/or face sheet. Moreover, when the honeycomb structure is combined with an inexpensive perforate face sheet it provides attenuation over only a relatively narrow frequency range. Currently, more expensive facesheet materials are capable of effective performance over a wide range of frequencies.

Hence, there is a need for a noise suppression material that is less costly to manufacture as compared to known materials, and/or can be readily conformed to contoured surfaces, and/or can be readily bonded to backing and/or face sheets, and/or is effective over a relatively wide frequency range. The present invention addresses one or more of these needs.

BRIEF SUMMARY

The present invention provides fiber-based acoustic treatment materials and methods of making the materials.

In one embodiment, and by way of example only, the fiber-based acoustic treatment material includes between about 3% and about 25% by weight of fibrillated aramid microfibers, between about 20% and about 75% by weight of reinforcement microfibers, and between about 15% and about 60% by weight of a binder.

In another embodiment, and by way of example only, a noise reduction component is provided that includes the fiber-based acoustic treatment material with between about 3% and about 25% by weight of fibrillated aramid microfibers, between about 20% and about 75% by weight of reinforcement microfibers, and between about 15% and about 60% by weight of a binder, wherein the material is configured to have a volume fraction solids of between about 1.5% and about 5.5%.

In still another embodiment, and by way of example only, a method is provided for forming the fiber-based acoustic treatment material. Fibrillated aramid microfibers and reinforcement microfibers are combined to form a mass such that the mass includes between about 5% and about 50% by volume of the fibrillated aramid microfibers and between about 50% and about 95% by volume of the reinforcement microfibers. At least a portion of the mass and a polymer binder are mixed to form an intermediate material such that the intermediate material includes between about 40% and about 85% by weight of the mass and between about 15% and about 60% by weight of the polymer binder. Multiple batches of the intermediate material are mixed again, placed in a container and then cured to form the acoustic treatment material.

Other independent features and advantages of the preferred material and methods will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a particular type of engine, or in a particular type of vehicle. Thus, although the present embodiment is, for convenience of explanation, described as being implemented in an aircraft environment, it will be appreciated that it can be implemented in various other types of vehicles, and in various other systems and environments.

Figure 1:
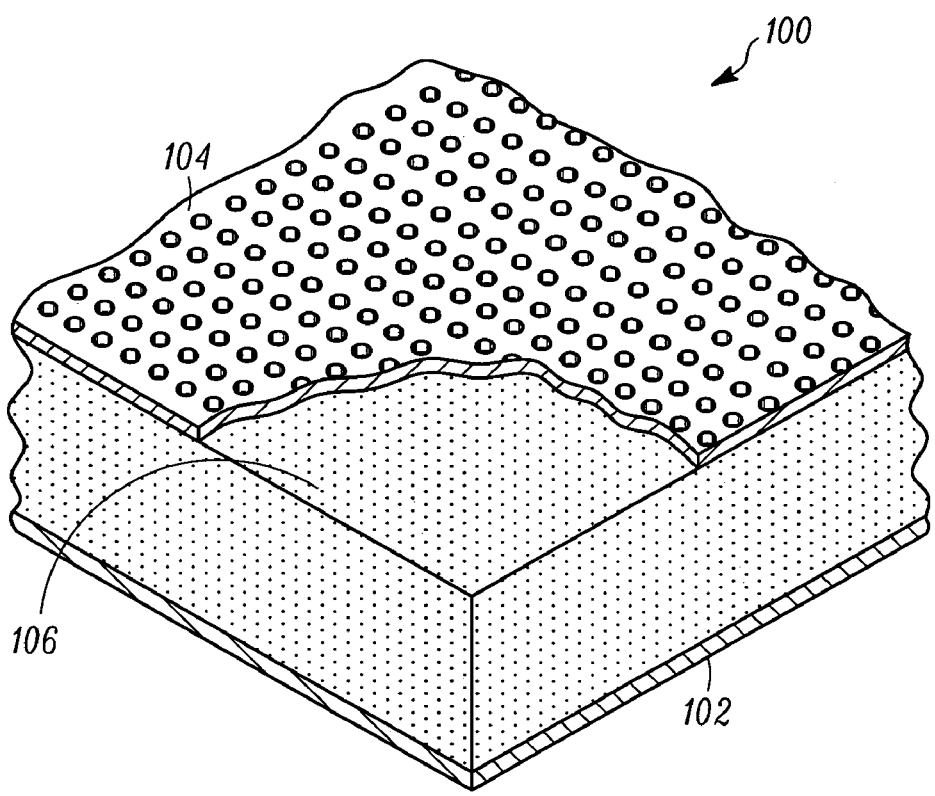
FIG. 1 is a perspective view of an exemplary noise suppression panel.
Figure 2:
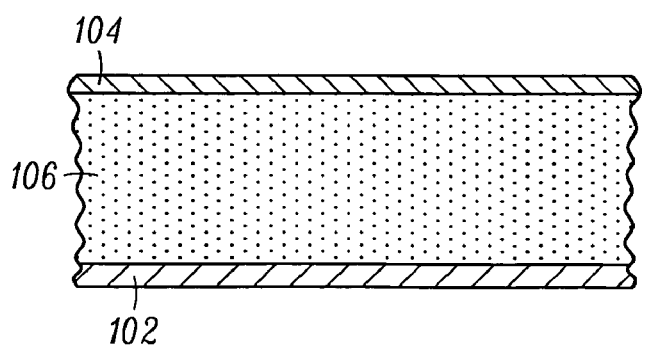
FIG. 2 is a cross section view of an exemplary noise suppression panel.

Turning now to the description, and with reference first to FIGS. 1 and 2, an exemplary noise suppression panel 100 is depicted in perspective and cross section views, respectively. The panel 100 includes a back plate 102, a face sheet 104, and a bulk absorber 106. The back plate 102 is preferably imperforate and is constructed of any one of numerous types of non-porous materials such as, for example, stainless steel. In a particular embodiment, however, the back plate 102 is constructed of bismaleimide (BMI). The back plate 102 may be bonded directly to the bulk absorber 106 during manufacture of the panel 100.

The face sheet 104 is constructed of any one of numerous types of materials such as, for example, stainless steel, or bismaleimide (BMI) carbon fiber composites. In one exemplary embodiment, the face sheet 104 is constructed of stainless steel, and is perforated to a desired percent open area (POA) value. As is generally known, relatively low POA values (e.g., ~5%) provide acoustic resistance, whereas relatively high POA values (e.g., ~30%) provide acoustic transparency. In another exemplary embodiment, the face sheet 104 is perforated to a POA value greater than 30% to ensure the face sheet 104 is acoustically transparent to any incident sound. Similar to the back plate 102, the face sheet 104 may be bonded to the bulk absorber 106 during manufacture of the panel 100.

The bulk absorber 106 is disposed between the back plate 102 and face sheet 104 and, as was mentioned above, is preferably directly bonded to the back plate 102 during manufacture of the panel 100. The bulk absorber 106 is made up of a random network of reinforcement microfibers and fibrillated microfibers. The microfibers are loosely held together by a binder. The bulk absorber 106 preferably has a volume fraction solids that is between about 1.5% and about 5.5%, and more preferably in the range of about 3% to 4%. The reinforcement microfibers are present at a ratio of between about 1:1 and about 15:1, by weight, to the fibrillated microfibers, and the binder is included at between about a 0.20:1 ratio to about 1.5:1 ratio, by weight, to the microfibers. Consequently, the bulk absorber 106 includes between about 3% and about 25% by weight of fibrillated microfibers, between about 20% and about 75% by weight of reinforcement microfibers, and between about 15% and about 60% by weight of the binder.

The reinforcement microfibers are relatively straight, stiff, high modulus fibers. These fibers, particularly when bonded to each other with a binder, give the material mechanical integrity or resistance to deformation. Any one of numerous suitable reinforcing microfibers may be employed. In one exemplary embodiment, the reinforcement microfibers include carbon based microfibers, and may be, for example polyacrylonitrile (PAN) based carbon fibers sold under the trade name Thornel® T-300 PAN available through Cytec Industries, Inc. of West Paterson, N.J. The average diameter of the Thornel® carbon fibers is about 7.5 micrometers with a range of about 5.5 micrometers to about 9.5 micrometers. In another exemplary embodiment, glass fibers are used. In still another exemplary embodiment, basalt microfibers are suitably used. One exemplary basalt microfiber that may be used is provided under the tradename Sudaglass® and is available through Sudaglass Fiber Technology, Inc. of Houston, Tex. The average diameter of the Sudaglass fibers is about 15 micrometers with a range of about 12 micrometers to 18 micrometers.

The fibrillated microfibers enable the formation of a network consisting of the combined microfibers, where the microfibers are randomly disposed without any particular orientation. In this regard, the fibrillated microfibers are highly branched and are capable of intertwining with the reinforcing microfibers to form a fluffy mass having multiple openings and the about 1.5% to about 5.5% volume fraction solids value mentioned above. Because the fibrillated fibers generally have a smaller diameter and are highly branched and contoured, they provide a higher resistance to air flow when compared to an equal mass of reinforcing fibers. A minimum flow resistivity is needed to obtain optimum acoustic performance; therefore the fibrillated fibers help achieve the minimum resistivity at a lower material density. Several fibrillated microfibers may be suitably employed. In one exemplary embodiment, the fibrillated microfibers are fibrillated aramid microfibers. The fibrillated aramid microfibers, also known in the art as fibrillated poly (aromatic amide) microfibers, are capable of maintaining integrity at temperatures of at least 280° C. and are available from E.I. DuPont de Nemours of Delaware under the tradename Kevlar® pulp. The diameters of the highly branched fibers of the Kevlar® pulp vary widely from about 0.5 microns to more than 20 microns. Another suitable fibrillated microfiber is, as an example, acrylic pulp.

To provide the random microfiber network with sufficient mechanical integrity for disposal in the panel 100, the binder is included. Phenolic powders are observed to improve the uniformity and increase the openness of the fiber mass. In one exemplary embodiment, the binder is a thermoset polymer binder. The polymer binder may be any one of numerous suitable materials that can hold the microfibers together but that does not significantly decrease the size of the openings in the random microfiber network. Suitable thermoset polymer binders include, but are not limited to powdered phenolic binders, such as Durite® binders AD-3239 or AD-5614 available through Hexion Specialty Chemicals of Columbus, Ohio. In another exemplary embodiment, thermoplastic powder binders are used and may include, for example, polyvinyl chloride or polyethylene. For higher temperature applications, the binder may be a glass or reactive ceramic powder. One example is KF-9079 glass powder from Asahi Glass Co. in Tokyo, Japan. The glass powder can be ball milled to a very fine powder, applied to the fibers in a manner similar to phenolic, and melted at a temperature in excess of its 325° C. softening temperature.

Figure 3:
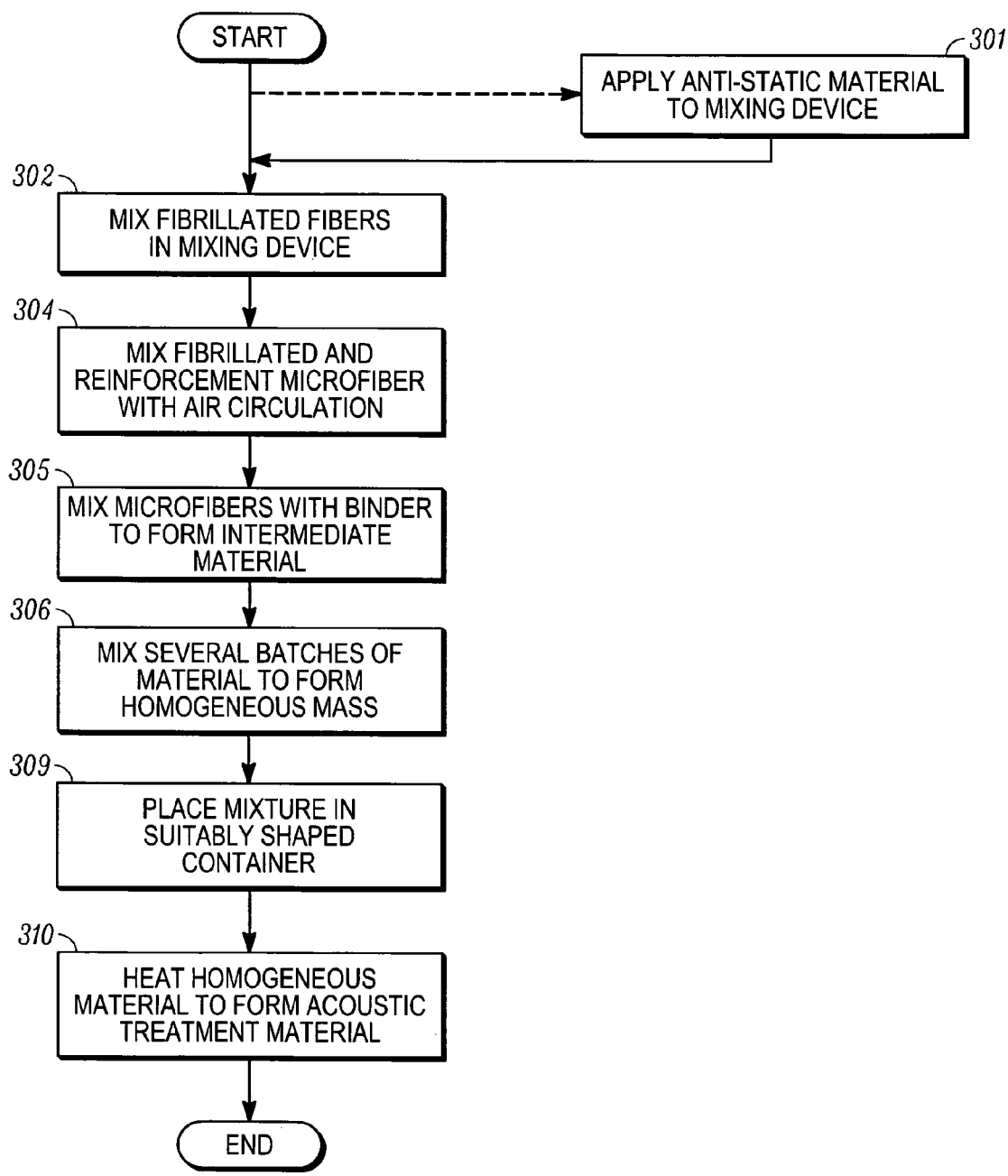
FIG. 3 is an exemplary method for manufacturing a material that may be used as a bulk absorber in the noise suppression panel shown in FIGS. 1 and 2.

One exemplary method 300 of manufacturing the bulk absorber 106 is depicted in FIG. 3. First, fibrillated fibers are mixed in a high speed mixing device, step 302. In some embodiments, the fibrillated fibers are obtained off-the-shelf and are pre-processed such that each fiber has a desired length. For example, the fibrillated fibers may be a pulped version of Kevlar® obtained through E.I. DuPont de Nemours of Delaware. The mixing device may be any one of numerous devices that includes a blade that contacts and mixes the microfibers. In some cases, the mixing device may be a blender, and the blade may have a sharp edge capable of cutting the fibers into shorter lengths. While the reinforcement microfibers and the fibrillated microfibers are mixed in a blender, air is supplied thereto, step 304. Air maintains a circulating flow of the fibers in the blender so the fibers are continuously exposed to the rotating blades; without air circulation or other large scale mixing, the fibers tend to from stationary masses in regions not contacted by the rotating blade. The mixing device may be pulsed by being turned on and off to redistribute fibers in the mixer. By this process, a loose, fluffy mass of microfibers is formed. Another possible mixing device is a commercial V blender which maintains fiber circulation by rotation of the chamber. To prevent the microfibers from sticking to the blade and/or other blender components during mixing, an anti-static material may be applied to the surfaces thereof prior to mixing, step 301.

Figure 4:
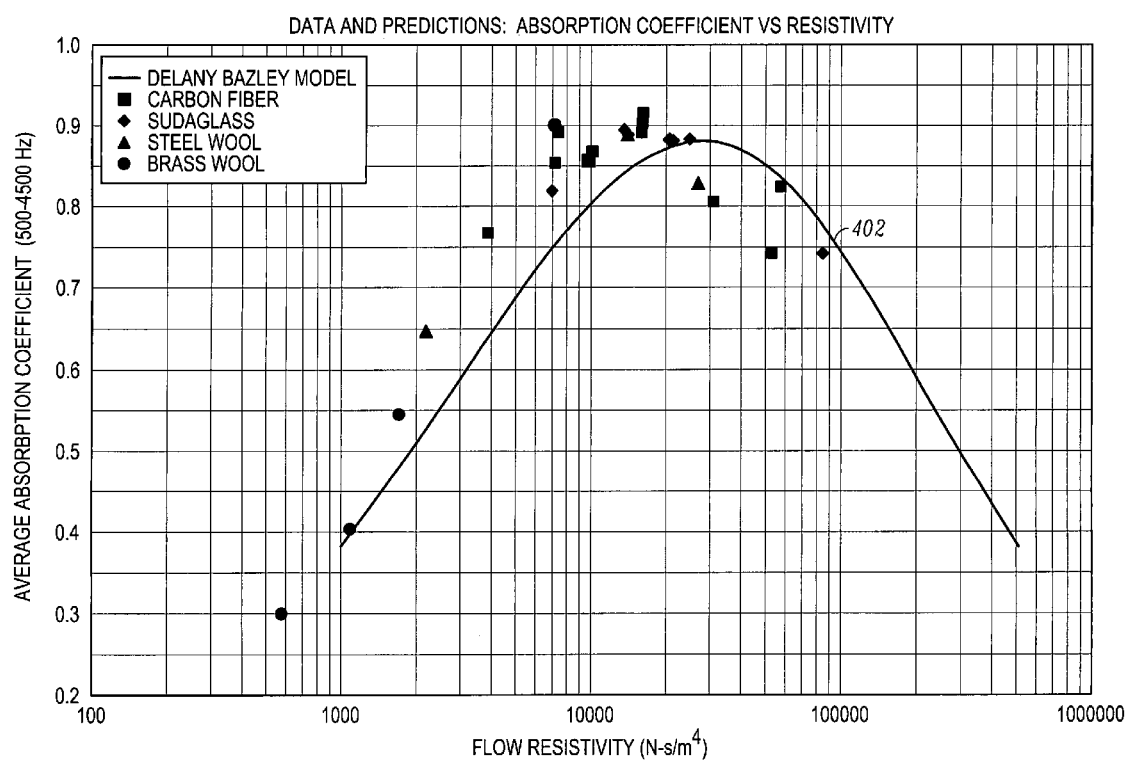
FIG. 4 is a graph showing flow resistivity values relative to average acoustic absorption coefficients.

In step 304, the particular reinforcement microfibers and the ratio at which to include the reinforcement microfibers relative to the fibrillated microfibers may be chosen based, in part, on flow resistivity values. A steady flow resistivity value that is in a particular range obtained from theory and experimental observation may be correlated with acoustic performance. Specifically, values of the acoustic absorption coefficient may be averaged over a specified frequency range. One example of such a correlation is shown in FIG. 4. Here, the experimental absorption data were obtained by averaging absorption coefficient data collected from an impedance tube over a specified frequency range (500 Hz to 4500 Hz). The predictions given in FIG. 4 were based on an empirical model by Delany and Bazley (*Applied Acoustics*, 3, 105-116, 1970). In particular the acoustic absorption coefficient ("α") for specified flow resistivity values ("σ") was calculated from the Delany and Bazley expressions for characteristic impedance ("Zc"), surface impedance ("Z"), and complex wave number ("k") with the following equations:

$$Z_c/\rho_o c_o = [1 + 0.0571 X^{-0.754} - j0.087 X^{-0.732}]$$

$$kc_o/\omega = [1 + 0.0978 X^{-0.700} - j0.189 X^{-0.595}]$$

where $$X = \rho_o f / \sigma.$$

$$Z = -jZ_c \coth(kd)/\phi,$$

and $$\alpha = 1 - \left|\frac{Z/\rho_o c_o - 1}{Z/\rho_o c_o + 1}\right|^2$$

where $\rho_o$ and $c_o$ are the density and speed of sound in air; $\phi$ is the porosity, f ($=\omega/2\pi$) is the frequency;

d is the specimen thickness, and $j^2=-1$.

The average absorption coefficients were calculated over the frequency range 500-4500 Hz for $\phi=0.96$ and d=3 cm. The results are shown in FIG. 4 as a solid line 402.

Similar results were obtained for calculations based on modeling a porous medium with a rigid frame by J. F. Allard (*Propagation of Sound in Porous Media*, Elsevier Applied Science, London, Chapter 5, 1993).

Experimental resistivity data based on various materials, such as carbon fiber-Kevlar pulp-phenolic combinations ("CARBON FIBER"); Sudaglass fibers-Kevlar pulp-phenolic ("SUDAGLASS"); bronze wool ("BRONZE WOOL"), and steel wool ("STEEL WOOL") are shown by the data points in FIG. 4. The resistivity data were obtained by flowing air at prescribed volumetric rates through a specimen measuring 1.375 inch (about 3.49 cm) in diameter by 1.25 inches (about 3.17 cm) long. The pressure drops were measured and flow resistivity was calculated; the characteristic resistivity used for this work was the resistivity extrapolated to zero flow rate. As shown in FIG. 4, the theory and data indicate the peak average absorption coefficient values generally fall in a range of 5000 to 50,000 N-s/m$^4$.

Based on the above theory and experimental flow resistivity values, ratios of reinforcement microfibers relative to the fibrillated microfibers between about 1:1 and 15:1, by weight, are used. Thus, the resulting mixture includes between about 50% and about 95% by weight of the reinforcement microfibers and about 5% and about 50% by weight of the fibrillated microfibers.

In some cases, the reinforcement microfibers may need to be formed before step 304. For example, reinforcement fibers may be obtained and cut into desired lengths before mixing with the fibrillated microfibers. In embodiments in which a blender is employed, the reinforcement fibers are broken into shorter microfiber segments by the blender blade when mixing occurs with the fibrillated microfibers.

After the microfibers are suitably mixed, the binder is added and mixed therein, step 305. Preferably, the binder is in a powder form, and an amount of the powder that is substantially equal to or less than the amount of the microfiber mass, by weight, is added to form an intermediate material. Thus, the intermediate material includes between about 15% to about 60% by weight of the binder and between about 40% and about 85% by weight of the microfibers.

In a final mixing step, several batches of material are placed in a large mixing vessel and agitated with air flow into the vessel which is rotated, step 306. A filter is disposed on any outlet of the vessel to prevent any binder or fibers from escaping. This final mixing step homogenizes the material to thereby yield a large-scale uniformity thereto and to thereby provide a more uniform distribution of the bulk absorber in the treatment housing.

The homogenized mixture is placed in a mold, step 309, and then heat treated to form the fiber-based acoustic treatment material, step 310. Heat treatment allows the binder to melt and, if the binder is a thermoset, to crosslink. The bonds among the various microfibers provide the mass with some degree of mechanical integrity. In one embodiment in which a phenolic binder is employed, the mixture is cured at a temperature of about 100° C. for between about 30 to about 40 minutes.

There has now been provided a noise suppression material that is less costly to manufacture as compared to known materials, and/or can be readily conformed to contoured surfaces, and/or can be readily bonded to backing and/or face sheets, and/or is effective over a relatively wide frequency range. The combination of the acoustic-reducing reinforcement microfibers with the fibrillated microfibers has an average sound absorption coefficient that is at least 32% higher than known high quality noise-reducing foams.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A fiber-based acoustic treatment material, comprising:
   between about 3% and about 25% by weight of fibrillated microfibers;
   between about 20% and about 75% by weight of reinforcement microfibers; and
   between about 15% and about 60% by weight of a powder binder.

2. The fiber-based acoustic treatment material of claim 1, wherein the reinforcement microfibers comprise carbon fibers.

3. The fiber-based acoustic treatment material of claim 1, wherein the reinforcement microfibers comprise basalt fibers.

4. The fiber-based acoustic treatment material of claim 1, wherein the fibrillated microfibers comprise aramid fibers.

5. The fiber-based acoustic treatment material of claim 1, wherein the powder binder comprises phenolic powder.

6. The fiber-based acoustic treatment material of claim 1, wherein the material is configured to have a volume fraction solids of between about 1.5% and about 5.5%.

7. The fiber-based acoustic treatment material of claim 1, wherein the material has a flow resistivity value that is between about 5,000 and about 50,000 N-s/m$^4$.

8. A noise-reduction component, comprising:

between about 3% and about 25% by weight of fibrillated microfiber;

between about 20% and about 75% by weight of reinforcement microfibers; and between about 15% and about 60% by weight of a powdered polymer binder, wherein the fibrillated microfiber and the reinforcement microfibers form a random network microfiber material configured to have a volume fraction solids of between about 1.5% and about 5.5% and an openness, and the powdered polymer binder substantially maintains the openness of the random network microfiber material.

9. The noise-reduction component of claim 8, wherein the reinforcement microfibers comprise carbon microfibers.

10. The noise-reduction component of claim 8, wherein the reinforcement microfibers comprise basalt microfibers.

11. The fiber-based acoustic treatment material of claim 8, wherein the fibrillated microfibers comprise aramid fibers.

12. The noise-reduction component of claim 8, wherein the powdered polymer binder comprises phenolic.

\* \* \* \* \*